C. E. BURCHFIELD.
INSECT DESTROYER.
APPLICATION FILED OCT. 25, 1919.
1,332,800.
Patented Mar. 2, 1920.
3 SHEETS—SHEET 1.
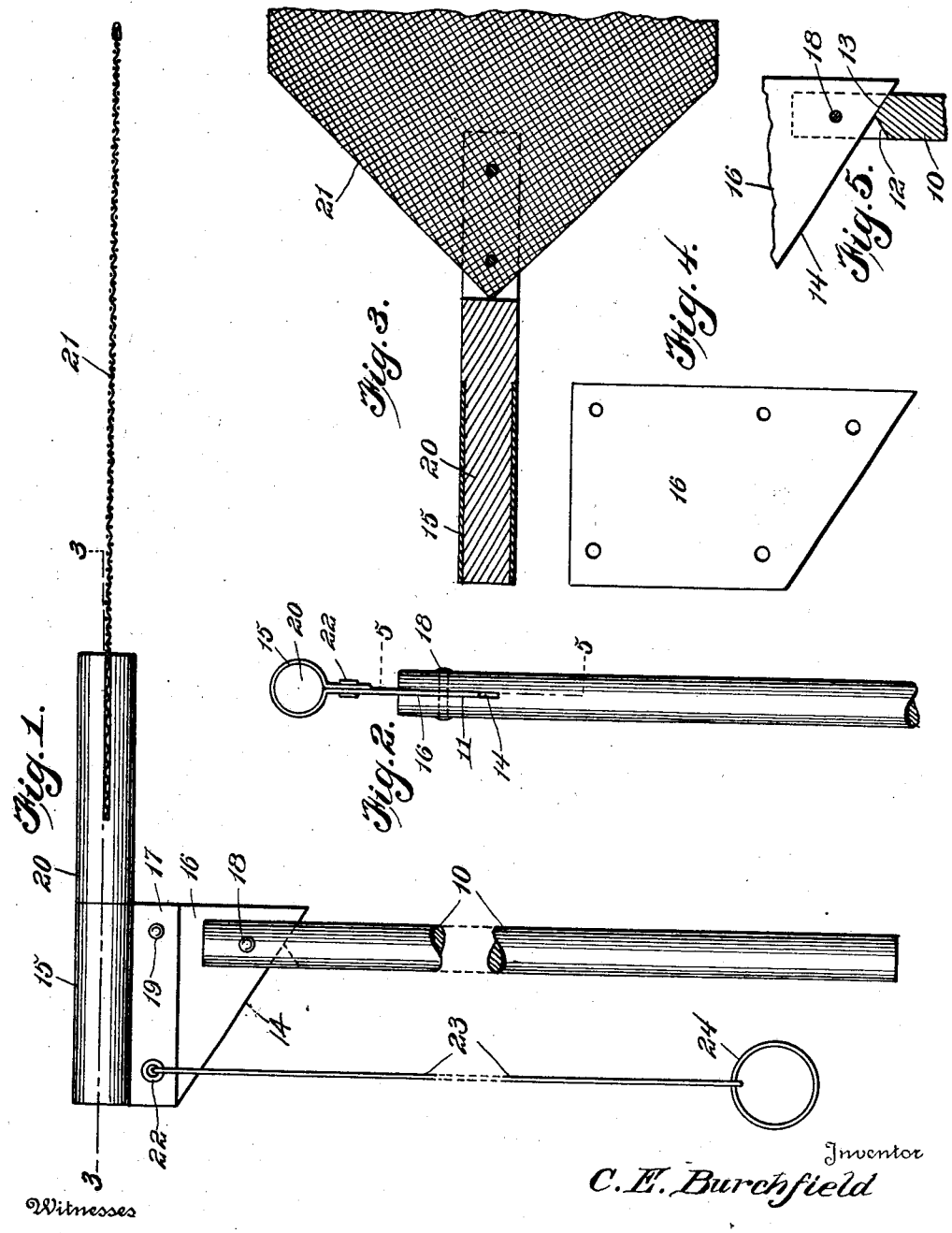

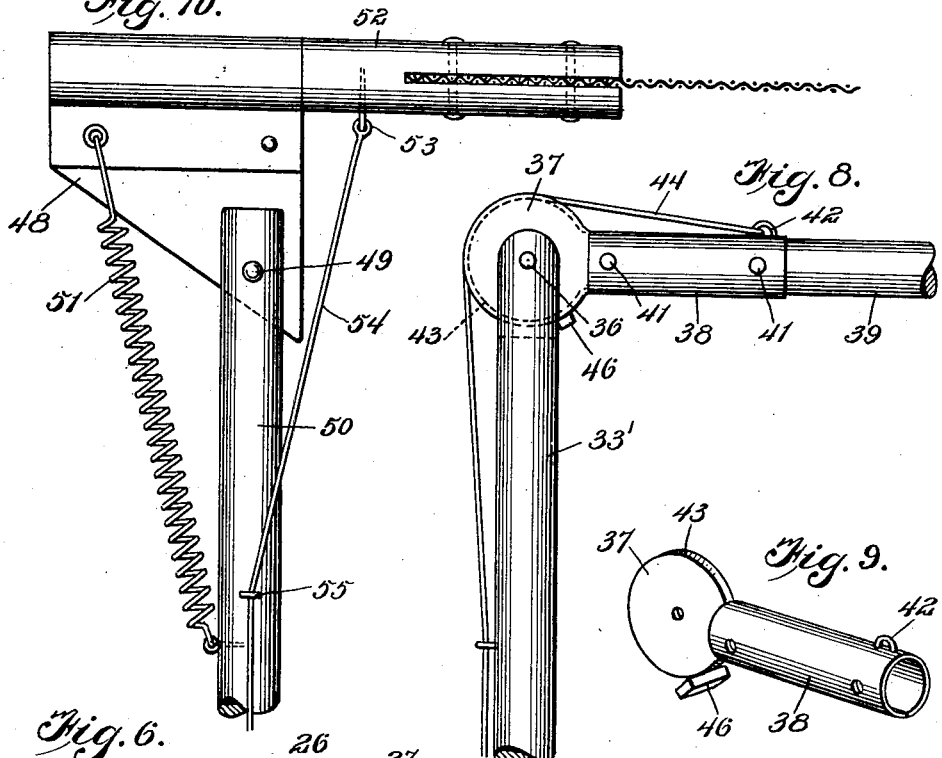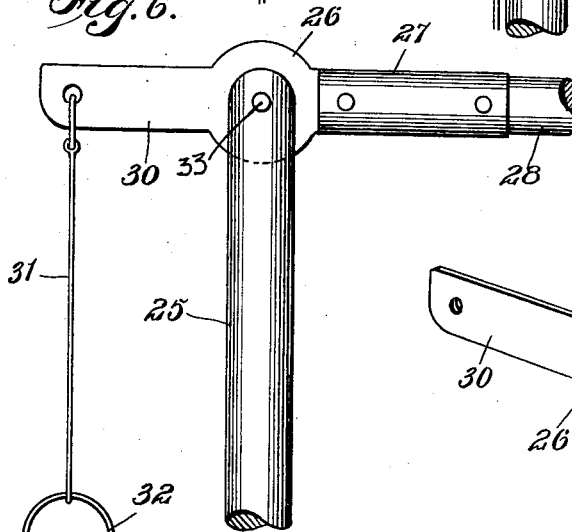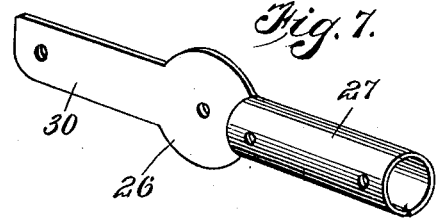

C. E. BURCHFIELD.
INSECT DESTROYER.
APPLICATION FILED OCT. 25, 1919.
1,332,800.
Patented Mar. 2, 1920.
3 SHEETS—SHEET 3.
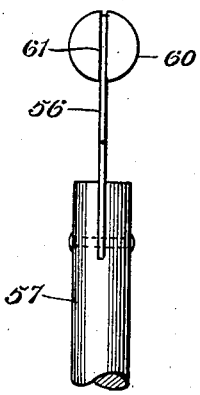
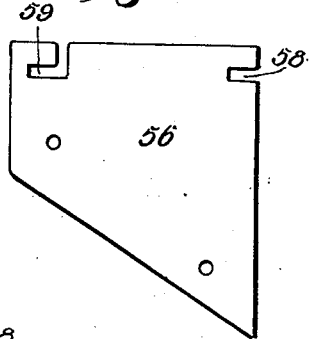
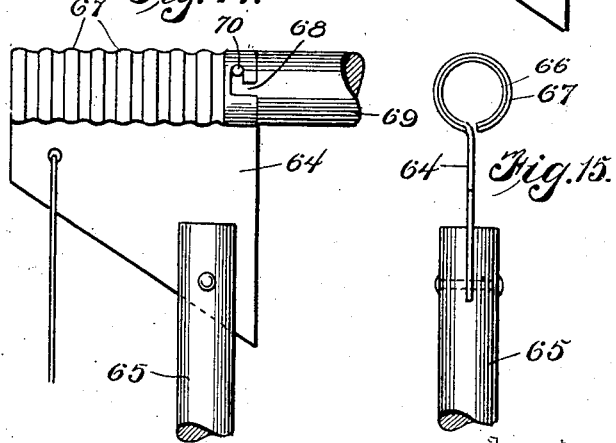

UNITED STATES PATENT OFFICE.

CLARENCE E. BURCHFIELD, OF BIG STONE GAP, VIRGINIA.

INSECT-DESTROYER.

1,332,800. Specification of Letters Patent. Patented Mar. 2, 1920.

Application filed October 25, 1919. Serial No. 333,138.

*To all whom it may concern:*

Be it known that I, CLARENCE E. BURCHFIELD, a citizen of the United States, residing at Big Stone Gap, in the county of Wise and State of Virginia, have invented new and useful Improvements in Insect-Destroyers, of which the following is a specification.

This invention has reference to improvements in insect destroyers, and is in the nature of a fly swatter.

Fly swatters of the ordinary construction comprise a flexible blade that is provided with an outstanding handle. With this class of insect destroyers, insects at a determined elevation, such as those resting on a wall near a ceiling or on the ceiling of a room can not be reached by the ordinary construction of such devices.

It may therefore be considered the primary object of the present invention to produce an insect destroyer including a pole-like standard or handle having pivotally secured to the outer or upper end thereof a socket member receiving therein the handle of an insect swatter, said socket having attached thereto a flexible element which is designed to be grasped by the operator to exert a pull on the socket to cause the same to assume an inclination with respect to the staff and to force the blade of the swatter against an insect resting at an elevation, and thus easily and quickly destroying all insects beyond reach of the ordinary swatter.

Other objects and advantages will present themselves as the nature of the invention is better understood, reference being had to the accompanying drawings in which there is illustrated a simple and satisfactory embodiment of the improvement reduced to practice, it being understood that the nature of the invention is such as to render the same susceptible to various changes in shape, proportion, material employed, etc., all of such changes, however, falling within the scope of what is claimed.

In the drawings:

Figure 1 is a side elevation of the improvement.

Fig. 2 is an end view thereof.

Fig. 3 is a sectional view approximately on the line 3—3 of Fig. 1.

Fig. 4 is a view of the blank from which the pivoted socket member is formed.

Fig. 5 is a detail sectional view approximately on the line 5—5 of Fig. 2.

Fig. 6 is a side elevation of a modification.

Fig. 7 is a perspective view of the socket member.

Fig. 8 is a side elevation of a further modification.

Fig. 9 is a perspective view of the socket member employed in Fig. 8.

Fig. 10 is a side elevation of a further modification.

Fig. 11 is a similar view of a still further modification.

Fig. 12 is an end view thereof.

Fig. 13 is a plan view of the pivoted rocking plate that supports the swatter illustrated in Figs. 11 and 12.

Fig. 14 is a detail side elevation of a still further modification.

Fig. 15 is an end view thereof.

In carrying out my invention I make use of a handle 10 which is preferably round in cross section and which provides the handle of the improvement. The handle may be in the nature of a telescopic member or may be constructed of removable sections. The handle at its upper end is bifurcated centrally as at 11, and the lower wall provided by the said bifurcation is inclined upwardly from the opposite sides of the handle, and the inclined surfaces thus provided are indicated by the numerals 12 and 13 respectively.

The socket member which receives the handle of the insect swatter is constructed from a single piece of metal, the lower edge of which being cut at an angle, as indicated by the numeral 14. The upper edge is rounded upon itself providing the socket proper, which is indicated by the numeral 15. The free end of the rounded portion that is formed on the body 16 of the device has its end formed with an extension 17 that is spaced from but is parallel to the body 16. The lower end of the body 16 is provided with an opening through which is passed a pivot 18 that secures the said lower portion in the bifurcated portion 11 of the handle 10, and by reference to the drawings it will be noted that the inclined edge 14 of the body of the socket rests normally on the inclined wall 13 at the lower end of the bifurcation, and it will be further noted that when the socket is swung, in a manner which will hereinafter be described, the said inclined surface 12 limits the swinging of the socket in an outward direction with respect to the handle 10. Suitable, preferably adjustable elements 19 pass through the straight extension 17 and the body 16, so that the rounded portion or socket 15 may be compressed around the rounded handle 20 of a flexible blade 21. This flexible blade may be constructed of wire cloth or of any other desired flexible material, such as a sheet of rubber.

Passing through the socket extension 17 and the body 16 adjacent the rear end of the socket is an eyelet 22. Connected to this eyelet is a flexible element or cord 23 and secured to the lower end of the cord is a ring 24. It will be apparent that a pull upon the ring will cause the pivoted body 16 of the socket to be swung in one direction on the handle 10, so that the blade 21 will be brought into forcible contact with an insect on an elevated surface to destroy the said insect.

In Figs. 6 and 7 the handle 25 has its upper end bifurcated and received in the said bifurcation is the rounded body portion 26 of the socket member, the socket member, indicated by the numeral 27 being formed on one end of the body and having transverse openings therethrough to receive the rounded handle portion 28 which carries a flexible blade. Extending from the opposite end of the body 26 is what may be termed a tail plate 30, and to this plate is connected a flexible element such as a cord 31 that has its lower end provided with a ring 32. The rounded flat body 26 when received in the bifurcated end 25 is pivotally connected to the said handle, as indicated by the numeral 33. It will be apparent that by a pull upon the flexible element 31 the socket member will be swung upwardly of the member 25, causing the blade to contact with an insect on an elevated surface.

In Figs. 8 and 9 of the drawings the handle or staff, indicated by the numeral 33' preferably has its upper end bifurcated and in the said bifurcation is pivoted, as at 36 the flat peripherally rounded body portion 37 of the socket carrying member. The socket for the member is indicated by the numeral 38 and receives therein the rounded handle 39 of a flexible blade, the handle being secured in the socket by rivets 41. The socket 38, upon the outer and upper end thereof is provided with a bail 42, and the periphery of the rounded body 37 is grooved as at 43. Secured to the bail 42 is one end of a flexible element 44, the said flexible element being trained around the grooved periphery of the body 37 and having its free end provided with a ring. It will be apparent that a pull upon the ring will cause the blade and the socket to be swung at an upward and outward angle with respect to the staff or handle 33. The socket 38 is normally retained at a right angle with respect to the staff or handle 33 through the medium of a block 46 that is secured to one edge of the body 37, and which contacts with one side of the staff or handle 33, while the limit of the swinging movement of the socket in an opposite direction will be delivered by the inner end of the socket with the opposite side of the staff or handle.

While in certain figures of the drawings I have illustrated the handle of the flexible blade secured by rivets in the sockets, it is to be understood that the frictional engagement between these parts will, in most instances, be sufficient for holding the swatter in the socket.

In Fig. 10 I have illustrated a still further modification. In this figure the swatter handle supporting member 48, which has its angle end pivoted as at 49 to the handle 50, is provided, adjacent its outer end with a spring 51. One end of this spring is also secured to the handle. The handle member for the swatter is indicated by the numeral 52 and is provided, upon one of its sides with an eye 53 to which the flexible operating member 54 is secured. This operating member passes through one or more guide eyes 55 on the handle 50. It will be apparent that the helical spring 51 will have a tendency to swing the swatter carrying member 48 to a position substantially parallel to that of the handle 50, or to a vertical angle with respect to the handle. By pulling upon the flexible element or cord 54 the swatter will be brought to the position illustrated in Fig. 10, and by releasing the hold on the said cord the spring will contract, causing the blade of the swatter to swat an insect.

In Figs. 11 and 12 the swatter supporting plate 56 which is pivoted in the bifurcated end of the handle 57 is not provided with the socket at the outer end thereof, but in lieu thereof has its inner edge provided with a longitudinal notch 58 and its upper edge provided with a bayonet slot 59. Also, in this instance, the handle 60 for the swatter is bifurcated from its outer end as at 61, and passing transversely through the said bifurcation are spaced pins 62 and 63 respectively, the said pins engaging in the notch 58 and in the bayonet slot 59 of the plate 56 when the handle 60 is removably connected to the remainder of the device.

In Figs. 14 and 15 the swatter supporting member or plate is indicated by the numeral 64 and is pivoted in the swatter 10 of a handle 65. The outer end of this plate 64 is rounded upon itself, providing a socket 66. This socket is corrugated or ribbed transversely throughout the length thereof, as indicated by the numeral 67. The socket 66 from the inner end thereof is provided with a bayonet slot 68, and the handle 69 for the swatter has a pin or lug 70 thereon designed to be received in the bayonet slot. It is, of course, to be understood that the blade of the swatter will be rightly positioned with respect to the supporting member and to the handle 65 when the lug 70 is received in the offset passage of the bayonet slot 68.

By this arrangement the socket portion of the plate 64 need not have its end brought against the side of the plate and secured thereto, as is true in the construction illustrated in Figs. 1, 2, 3, 4 and 10, the ribs or corrugations reinforcing the socket in addition to providing frictional contact members for the handle 69 of the swatter.

From the foregoing description, when taken in connection with the drawings, the simplicity of the construction and the advantages thereof will be readily apparent to those skilled in the art to which such inventions relate without further detailed description.

Having thus described the invention, what is claimed as new, is:—

In an insect destroyer of the class described, a staff or handle having its outer end bifurcated and the lower wall provided thereby arranged angularly, a member comprising a plate having its lower edge disposed at an inclination received in the bifurcation and pivotally secured therein, a flexible pull element secured to the said member, and a swatter removably connected to the member, and the angular inner wall of the bifurcation designed to serve as stop means for the member when a pull is exerted upon the pull member to limit the swinging movement of the member and swatter and also designed when the pull member is released to sustain the pivoted swatter supporting member and swatter at an angle with respect to the handle.

In testimony whereof I affix my signature.

CLARENCE E. BURCHFIELD.